United States Patent
Suzuki (10) Patent No.: US 8,520,954 B2
(45) Date of Patent: Aug. 27, 2013

(54) APPARATUS FOR DETECTING LANE-MARKING ON ROAD

(75) Inventor: Shunsuke Suzuki, Anjo (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 12/932,607

(22) Filed: Mar. 1, 2011

(65) Prior Publication Data
US 2011/0216938 A1  Sep. 8, 2011

(30) Foreign Application Priority Data
Mar. 3, 2010 (JP) .................................. 2010-046664

(51) Int. Cl.
*G06K 9/66* (2006.01)

(52) U.S. Cl.
USPC ............................ 382/199; 358/474; 358/464

(58) Field of Classification Search
USPC .................................. 382/103, 104, 199, 208
See application file for complete search history.

(56) References Cited

U.S. PATENT DOCUMENTS

| | | | | |
|---|---|---|---|---|
| 5,874,904 A * | 2/1999 | Hirabayashi et al. | ......... | 340/903 |
| 6,091,833 A * | 7/2000 | Yasui et al. | ................... | 382/104 |
| 6,813,370 B1 * | 11/2004 | Arai | ............................... | 382/104 |
| 6,829,388 B1 * | 12/2004 | Sakurai | ......................... | 382/199 |
| 7,421,095 B2 * | 9/2008 | Ikeda et al. | .................... | 382/104 |
| 8,094,934 B2 * | 1/2012 | Morimitsu | ..................... | 382/168 |
| 2002/0031242 A1 * | 3/2002 | Yasui et al. | ..................... | 382/104 |
| 2008/0088707 A1 * | 4/2008 | Iwaki et al. | ................ | 348/208.1 |
| 2009/0147083 A1 * | 6/2009 | Pawlicki et al. | ............... | 348/119 |
| 2010/0054538 A1 * | 3/2010 | Boon | ............................ | 382/104 |

FOREIGN PATENT DOCUMENTS

| | | |
|---|---|---|
| JP | 11-086199 | 3/1999 |
| JP | 2001-236506 | 8/2001 |
| JP | 2002-022439 | 1/2002 |
| JP | 2006-350571 | 12/2006 |

* cited by examiner

*Primary Examiner* — Vu Le
*Assistant Examiner* — Aklilu Woldemariam
(74) *Attorney, Agent, or Firm* — Harness, Dickey & Pierce, PLC

(57) ABSTRACT

The image processing ECU periodically acquires road-surface images and extracts edge points in the acquired road-surface image. Subsequently, the ECU determines the operating mode and extracts the edge line when the operating mode is either a dotted mode or a frame-accumulation mode. The edge points are transformed e.g. Hough transform, to extract an edge line that most frequently passes through the edge points. The extracted edge line denotes the lane marking. The ECU outputs a signal to activate a buzzer alert when determining the vehicle may depart from the lane.

15 Claims, 4 Drawing Sheets

FIG.3A

RUNNING DIRECTION OF VEHICLE

FIG.3B

SUBSEQUENT FRAME

FIG.4A

RUNNING DIRECTION OF VEHICLE

FIG.4B

SUBSEQUENT FRAME

APPARATUS FOR DETECTING LANE-MARKING ON ROAD

CROSS REFERENCE TO RELATED APPLICATION

This application is based on and claims the benefit of priority from earlier Japanese Patent Application No. 2010-046664 filed on Mar. 3, 2010, the description of which is incorporated herein by reference.

TECHNICAL BACKGROUND

1. Field of the Invention

The present invention relates to a detection apparatus for detecting a lane marking on a road, and more particularly to an on-vehicle detection apparatus for detecting the lane marking based on road-surface images detected from an area in front of the vehicle.

2. Description of the Related Art

Conventionally, there have been disclosed detection apparatuses capable of detecting the lane marking on the road based on an image-processing result processed from detected road-surface images from an area in front of the vehicle. The lane marking is referred to as a line on the road which is used to differentiate traffic lanes for running vehicles. The lane marking is generally produced as a white line consisting of a dotted line and a solid line, or a raised road marker placed along a traffic lane at constant intervals.

The detection apparatus is configured to extract edge points showing the white line or the raised road markers on the road and to detect the lane marking based on a plurality of extracted edges. The detected lane marking in combination with vehicle-information such as velocity, running direction and steering angle is used to detect any departure from the traffic lane. Also, the detected lane marking and such information can be used for automatic steering control of the vehicle.

When the painted length of the lane marking is short so that the intervals between the lane marking are long, or raised road markers only are used to separate the lanes, it is considered that the image of the lane marking does not match a frame of the image to be processed so that the lane marking may not be recognized by the detection apparatus properly. That is, an accuracy to detect the lane marking (detection accuracy) may be decreased. Specifically, when the detection accuracy is decreased and if the vehicle is departing from the lane, necessary alert (e.g. departure alert) to the driver on vehicle may not be performed appropriately. Further, some of vehicle-control functions may be affected by the decreased detection accuracy.

In this regard, to solve the above-described problem, for instance, a Japanese patent application laid-open publication No. 2006-350571 discloses a lane-marking detection apparatus in which the lane marking is detected from the latest image combined with previous images which have been acquired. This detection apparatus is designed in order to enhance the detection accuracy of the lane marking by increasing the number of objects of the lane marking (i.e., the number of edge points).

The detection apparatus disclosed in the foregoing publication is configured to extract the edge points from image data taken by on-vehicle camera and to generate linear-shape edge lines (i.e., lane markings) by appropriately linking the respective edges. However, the detection apparatus is designed to combine the frames only when the linear-shape edge line cannot be generated from edges of an acquired single frame. When the number of extracted edges is not enough to generate the edge line, but the linear-shape edge is generated successfully, the frames are not combined. In this case, since the linear-shape edge line is generated based on lower extracted edges than desirable number of edges, detection accuracy may be decreased.

SUMMARY

An embodiment provides an apparatus for detecting a lane marking on road with high detection accuracy.

As a first aspect of the embodiment, a detection apparatus mounted on a vehicle adapted to detect a lane-marking on the road based on a road-surface image taken from a road surface in front of the vehicle, includes: acquiring means for periodically acquiring the road-surface image and each acquired road-surface image being framed into a single frame; extracting means for extracting an edge point from the frame framed by the acquiring means; lane detecting means for detecting the lane-marking by using a predetermined procedure based on the edge point extracted by the extracting means; and first determining means for determining whether or not the number of edge point located on the lane-marking detected by the lane detecting means is smaller than a predetermined threshold value, wherein the lane detecting means is configured to detect the lane-marking based on the edge point extracted from the road-surface images in a plurality of frames subsequently framed by the acquiring means, when the first determining means determines that the number of edge point is smaller than the predetermined threshold value.

According to the above-described detection apparatus, the lane-marking can be detected based on the plurality of frames even when the number of edge points located on the lane-marking detected based on a road-side image of a single frame (hereinafter may be referred to a frame) is smaller than the predetermined threshold value. In other words, the lane-marking is detected based on the plurality of frames when it is expected that the lane-marking is not detected accurately because the lane-marking has been detected by less edge points. As a result, the lane-marking can be detected with high accuracy.

When the lane-marking is accurately detected because the number of edge points located on the lane marking is larger than the predetermined threshold value, the lane-marking can be detected by using a single frame. Hence, since redundant processing is avoided, the processing load can be reduced.

The above-described edge points located on the lane-marking can be edge points located within a predetermined distance from the edge line (lane-marking) detected based on the plurality of edge points extracted from the road-surface image. Alternatively, when a Hough transform is performed, the edge points voted for the edge lines of the Hough transform can be used for the above-described edge points.

The procedure to detect lane-marking based on the plurality of frames is not limited to a case when the number of edge points is relatively small. For instance, a detection apparatus according to a second aspect of the embodiment, when the lane marking based on the edge points extracted from the road-side image of a single frame cannot be detected by using the predetermined procedure (i.e., mathematical technique), the lane-marking can be detected based on the edge point extracted from the road-surface images in a plurality of frames subsequently framed by the acquiring means.

According to the detection apparatus configured as described above, even when the lane-marking cannot be detected based on a single frame, the lane-marking can be detected by using a plurality of frames. Therefore, the lane-marking can be detected by the detection apparatus in various cases other than the case when enough edge points on the lane-marking are secured.

In the above-described detection apparatus, the number of frames to be used when the number of edge points is not sufficient and when the lane-marking is not detected, may be the same number. However, the number of frames to be used for detecting the lane-marking can be changed. Specifically, according to a third aspect of the embodiment, when the lane-marking is not detected by using the predetermined procedure, the detection apparatus can be configured such that the number of frames used for extracting the edge point is set to be larger than the number of frames used when the number of edge point is smaller than the predetermined threshold value.

As described, in the detection apparatus of the embodiment, when the lane-marking cannot be detected based on a single frame in which the edge points is not sufficient, a relatively large number of frames can be used for extracting the edge points. Meanwhile, if the lane-marking is detected based on a single frame, but lacks the number of edge points, a relatively small number of frames can be used for extracting the edge points.

Accordingly, when the number of edge points is not sufficient to detect the lane-marking, an appropriate number of frames can be added depending on the estimated number of missing edge points. Therefore, decreasing accuracy for detecting the lane-marking because of using inappropriate number of frames can be suppressed. Moreover, increase of processing load due to using large number of frames can be suppressed.

When the frames are combined while the vehicle is running along the lane-marking, the relationship of position between the lane-marking and the road-surface image is constant. Therefore, the frames are simply combined to increase the number of edge points in the combined frame. However, when the running direction of the vehicle is crossing the lane-marking so that the relationship of the position between the lane-marking and the road-surface image varies, if the frames are combined without any modification, the edge points of the added frame cannot be set properly.

The detection apparatus according to a fourth aspect of the embodiment includes a function for detecting an angle formed between a line extending from the lane marking detected by the lane detecting means and a line extending from a direction that the vehicle runs and a function for calculating a distance the vehicle runs during a period from a time when a previous frame is acquired to a time when a latest frame is acquired. The detection apparatus is configured to detect the lane-marking based on the edge point extracted from the road-surface images in a plurality of frames subsequently framed by the acquiring means such that the lane detecting means i) combines the plurality of frames including the latest frame and the previous frame, ii) estimates an amount of movement of the lane-marking which moves in a direction perpendicular to a running direction of the vehicle and the movement of the lane-marking being recognized in the combined frames, the amount of the movement being estimated based on the angle detected by the angle detecting means and the distance calculated by the calculating means, and iii) moves positions of the edge points extracted from the road-surface images in the combined frames based on the estimated amount of the movement so as to detect the lane-marking.

Thus, since the edge points in the combined frame are set properly, even when the running direction of the vehicle and the lane-marking cross each other, the detection apparatus configured as described above can detect the lane-marking with high accuracy.

DETAILED DESCRIPTION OF THE PREFERRED EMBODIMENTS

With reference to the drawings, hereinafter will be described embodiments of the present invention. It is understood that other embodiments may be utilized and structural and operational changes may be made without departing from the scope of the present invention.

(Embodiment)
(1) Configuration of the Lane-Departure Warning System 1

Figure 1:
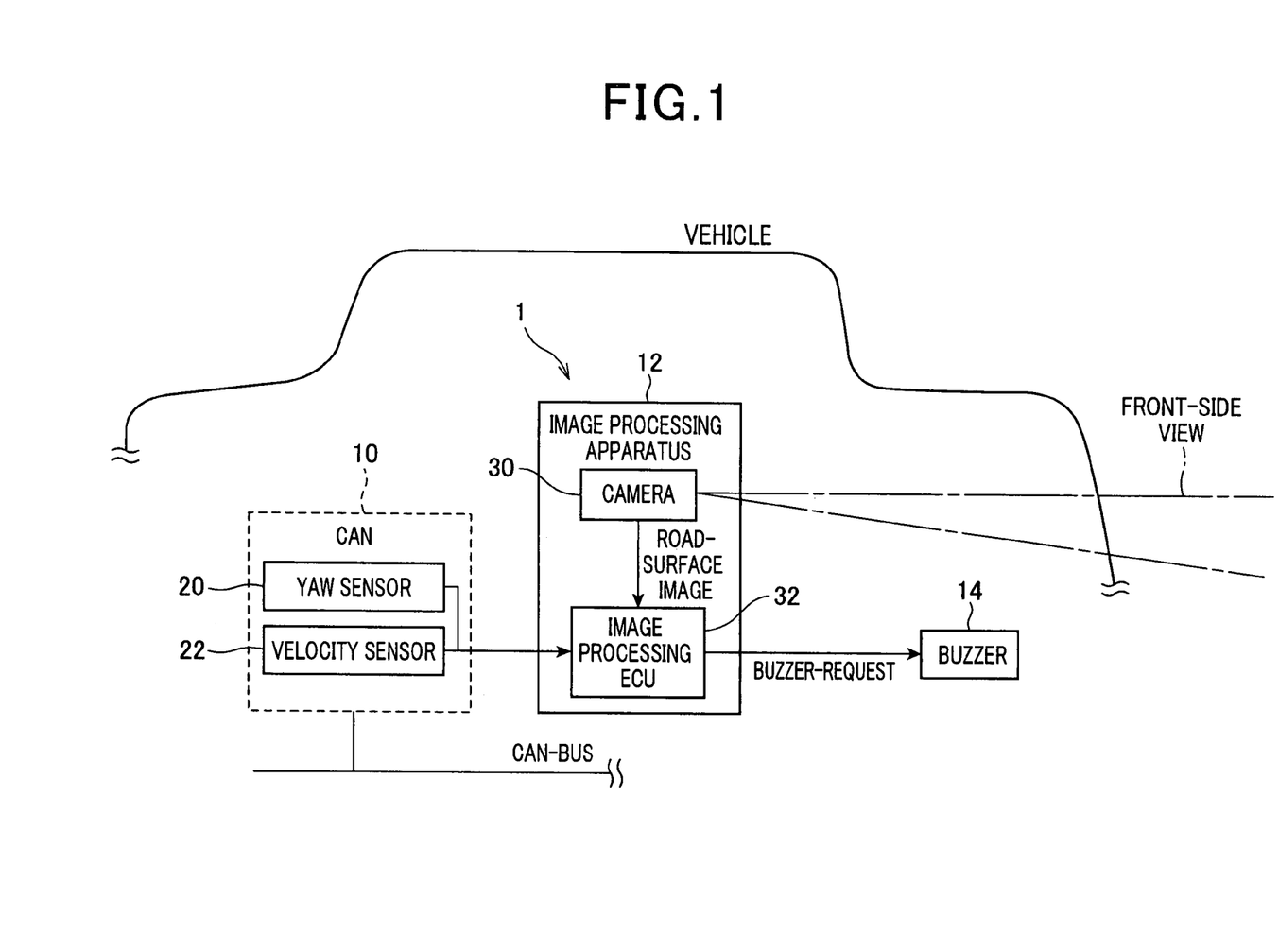
FIG. 1 is a block diagram showing an overall configuration of a lane-departure warning system according to an embodiment of the present invention.

The lane-departure warning system 1 is mounted on a vehicle such as passenger cars or the like. As shown in FIG. 1, the lane-departure warning system 1 includes a vehicle network device 10 connected to CAN (control area network) bus, an image processing apparatus 12 and a buzzer 14.

The vehicle network device 10 includes a yaw rate sensor 20 for detecting an angular rate at a turning-direction of the vehicle (i.e., yaw rate) and a velocity sensor 22 that detects running speed of the vehicle. The image processing apparatus 12 includes a camera 30 and an image processing ECU (Electronic Control Unit) 32. The image processing ECU 32 is configured to process images taken by the camera 30 and outputs a buzzer-request signal to a buzzer 14. It is noted that the image processing ECU 32 serves as a detection apparatus in the present invention.

Figure 6:
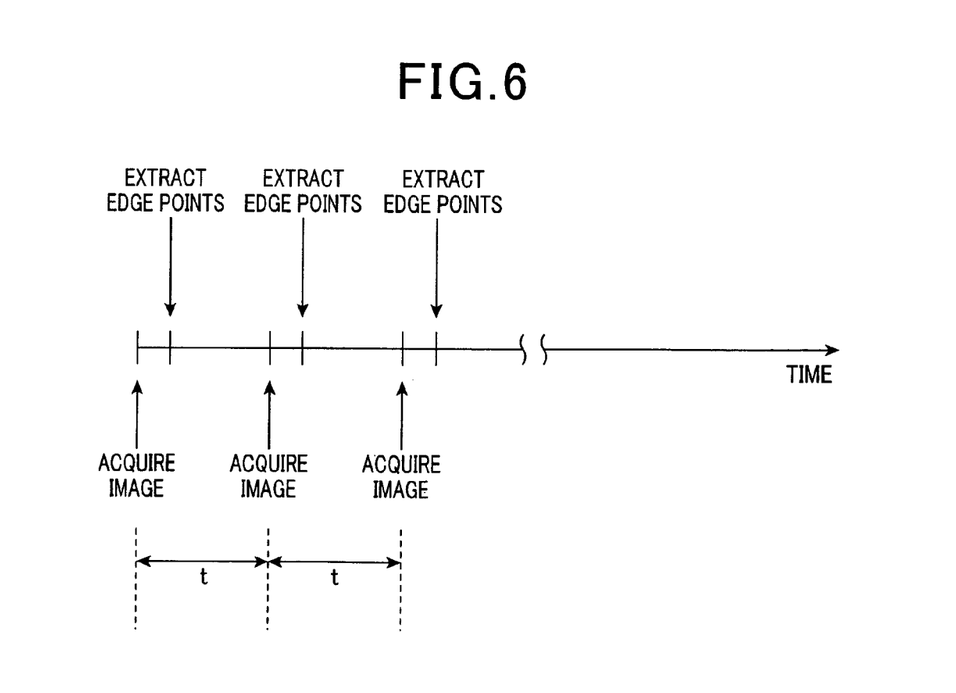
FIG. 6 is a timing diagram showing timing for acquiring road-surface images and timing for extracting edge points from the acquired road surface images.

The camera 30 is mounted on the vehicle, e.g. mounted in a center portion of a front side of the vehicle, and is configured to acquire a front-side view from the vehicle including road-surface image lying in front of the vehicle. As shown in FIG. 6, the camera 30 is configured to periodically acquire the front-side view at predetermined intervals t (e.g. $\frac{1}{10}$ second according to the embodiment). The camera 30 outputs the acquired road-surface image data (or referred to road-surface image) to the image processing ECU 32. The camera 30 can be various types of cameras such as a CCD camera adapted to acquire visible images, a camera using an image pick-up tube and an infrared camera adapted to acquire infrared images.

The image processing ECU 32 is mainly configured by a known microprocessor (not shown) including CPU (central processing unit), ROM (read only memory), RAM (random access memory), I/O (input-output) interface and a bus line to be used for connecting these blocks.

The image processing ECU 32 is configured to execute a lane-departure warning procedure (described later) by using an application program stored in the ROM and various data stored in the RAM. The image processing ECU 32 is electrically connected to the vehicle network device 10 via CAN-bus and is configured to communicate with the yaw rate sensor 20 and the velocity sensor 22 whereby the ECU 32 acquires output of respective sensors.

Further, since the image processing ECU 32 is electrically connected to the buzzer 14, when an alert event is detected by the lane-departure warning procedure, the image processing ECU 32 outputs the buzzer-request signal. The buzzer 14 sounds an alert buzzer towards the vehicle inside when the buzzer 14 receives the buzzer-request signal outputted by the image processing ECU 32.

(2) Procedure Executed by the Image Processing ECU 32

Figure 2:
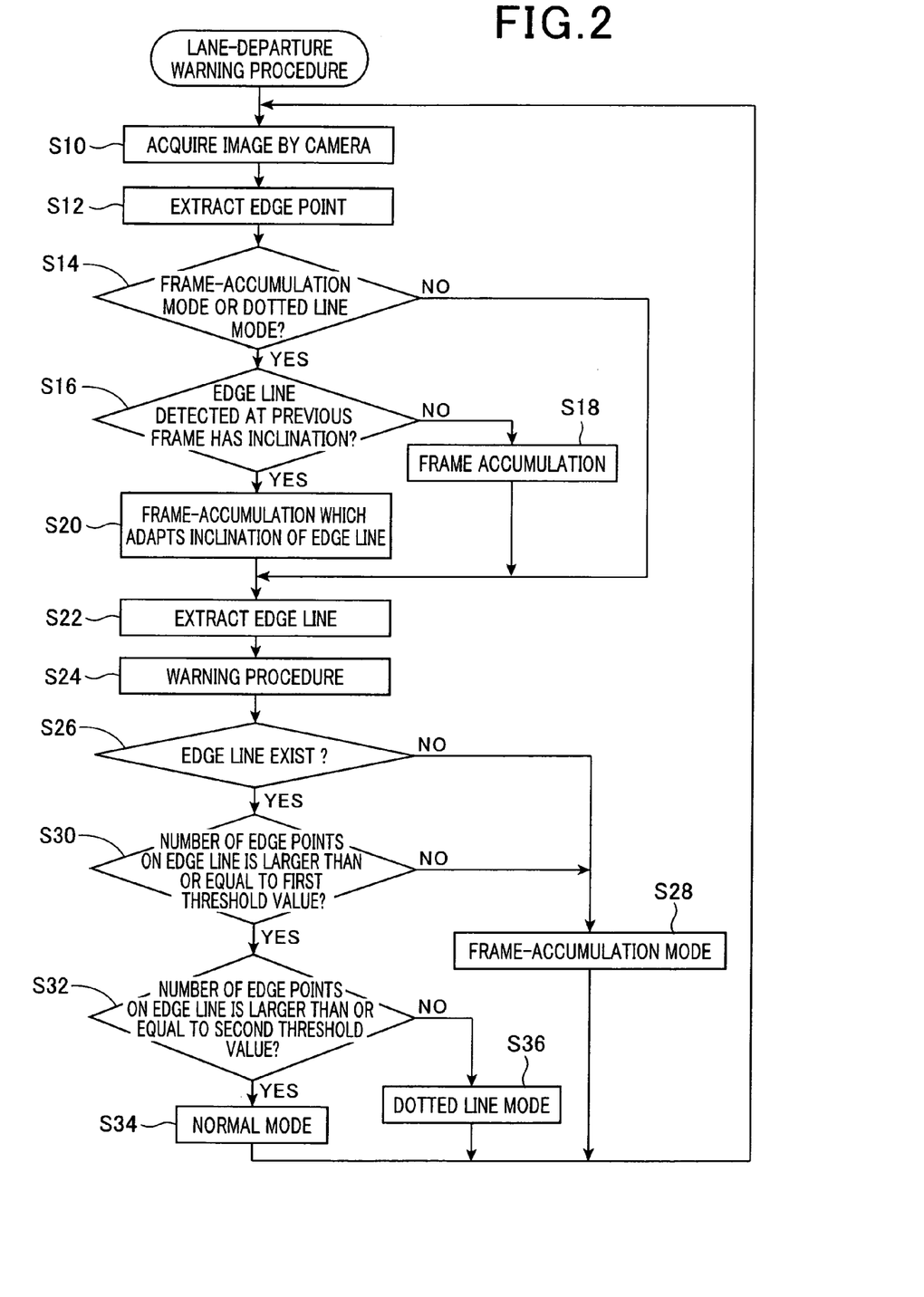
FIG. 2 is a flowchart showing a procedure of a lane-departure warning executed by an image processing ECU (Electronic Control Unit)

With reference to FIG. 2, a procedure of the lane-departure warning procedure executed by the image processing ECU 32 is described as follows. The lane-departure warning procedure is activated when the power is supplied to the image processing apparatus 12 in response to turning ON of the accessory switch of the vehicle and repeatedly executed until the power supply is cutoff in response to turning OFF of the accessory switch.

In the lane-departure warning procedure, the road-surface image data is acquired by the camera 30 at step 10. The acquired road-surface image is framed (written) into a predetermined single frame every time when the road-surface image is acquired by the camera 30. Subsequently, at step 12, the image processing ECU 32 extracts the edge points based on the acquired road-surface image acquired at step 10. The specific procedure for extracting the edges is not limited. However, various procedures can be used for extracting the edges from the road-surface image, for instance, Canny edge detection method or a differential edge detection method can be used for extracting the edges. Please note that as shown in FIG. 6, above-described procedures executed at steps 10 and 12 are periodically executed at constant intervals, e.g. 1/10 second.

Subsequently, at step 14, it is determined whether the operation mode is a dotted line mode or a frame-accumulation mode. It is noted that the image processing ECU 32 has operating modes consisting of a normal mode, the dotted line mode and the frame-accumulation mode. The operating modes are set in the subsequent steps (steps 28, 34 and 36). The specific procedure for detecting the lane marking from the road-surface image is changed depending on the operating modes (detail explanation will be described later). In the initial state, the operating mode is set as the normal mode.

At step 14, when the operating mode is determined neither the dotted line mode nor the frame-accumulation mode (S14: NO), i.e., the operating mode is set as the normal mode, the image processing ECU 32 proceeds to the next step 22. When the operating mode is determined either the dotted line mode or the frame-accumulation mode, the ECU 32 proceeds to step 16.

Next at step 16, it is determined that whether or not the edge line detected at previous frame has an inclination. It is noted that the previous frame is a frame including a road-surface image acquired at step 10 executed in the previous lane-departure warning procedure (a frame acquired one cycle before from the present lane-departure warning procedure).

Regarding the above-described road-surface image, the edge line has been extracted at step 22 executed at previous (one cycle before) lane-departure warning procedure. At step 16, the image processing ECU 32 detects an angle formed between the extracted edge line (i.e., lane marking determined at one cycle before) and the running direction of the vehicle. This angle can be calculated from positions of the edge line in the road-surface image. It is determined that the edge line has an inclination when the measured angle is larger than or equal to a predetermined angle (e.g. 5 deg.).

Figure 3A:
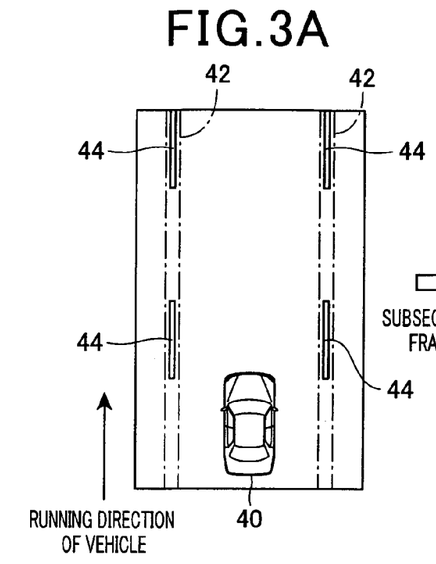
FIGS. 3A and 3B are diagrams for explaining a procedure for detecting a lane marking by using accumulated frames of road-surface images, the diagram showing a vehicle viewed from above of the vehicle.
Figure 3B:
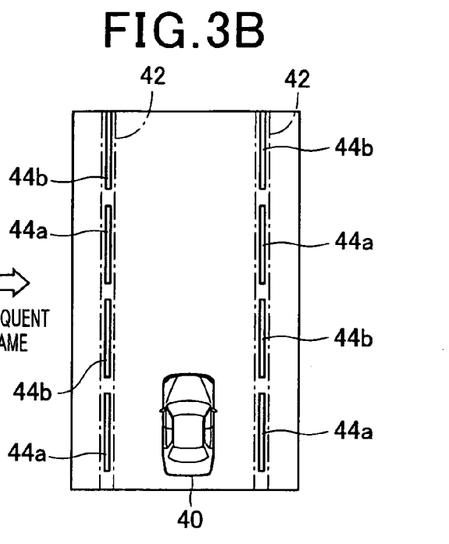

At step 18, when the angle of the edge line is smaller than the predetermined angle (S16: NO), the image processing ECU 32 performs a normal frame-accumulation procedure in which influences of the inclination is not considered. FIGS. 3A and 3B are diagrams for explaining a procedure for detecting a lane marking according to the lane-departure warning system 1 of the embodiment. In the procedure, the road-surface images (frames) acquired sequentially in time by the camera 30 are accumulated. In FIG. 3A, it is indicated an image around the vehicle 40 acquired at a time when the road-surface image is acquired. In FIG. 3B, it is indicated an image around the vehicle 40 acquired at a time when the subsequent road-surface image is acquired. It is noted that the lane marking 42 is an imaginary line used for explanation. Hence, the lane marking 42 does not exist on the actual road.

When the vehicle 40 is running along the lane marking on the road, relationship between the vehicle 40 and the lane marking 42 is not changed. Therefore, as similar to the dotted line 44a in FIG. 3B, a dotted line 44 forming the lane marking 42 as shown in FIG. 3A moves in a direction opposite to the running direction of the vehicle 40 and the dotted line 44 is being on the lane marking 42.

When it is assumed that the two frames are combined such that the dotted line 44b of the FIG. 3B is adjusted to be on the dotted line 44 of the FIG. 3A, both of the dotted lines 44a and 44B are located on the lane marking 42 properly. Accordingly, the edge line is detected by using edge points included in the dotted lines 44a and 44b whereby the lane marking 42 can be detected accurately.

To perform above-described procedure, at step 18, the edge points extracted just before at step 12 and the edges that have been extracted at past step 12 are combined (a frame-accumulation). When the operating mode is the dotted line mode, the edges included in past one frame is combined with the edges of the latest frame. When the operating mode is the frame-accumulation mode, edges included in the past two frames are combined with the edges of the latest frame. Subsequently, the image processing ECU 32 proceeds to step 22.

Figure 4A:
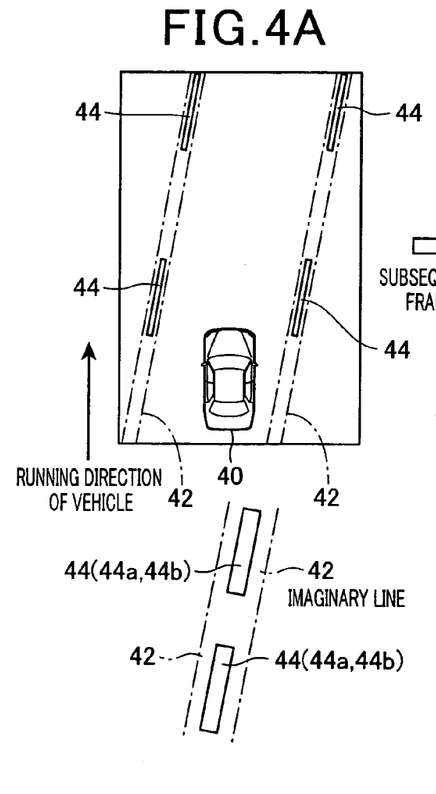
FIGS. 4A and 4B are diagrams for explaining a procedure for detecting a lane marking by using accumulated frames of road-surface images, the diagram showing a vehicle viewed from above of the vehicle.

When the edge line has an inclination having an angle larger than the predetermined angle at step 16 (S16: YES), the image processing ECU 32 performs the frame-accumulation procedure at step 20, which adapts the inclination of the edge line. FIGS. 4A, 4B, 5A and 5B illustrate a procedure to detect the lane marking in which the road-surface images (frames) acquired sequentially in time by the camera 30 are accumulated when the vehicle 40 is running towards a direction crossing the lane marking on the road. FIG. 4A indicates an image around the vehicle 40 acquired at a time when the road-surface image is acquired and FIG. 4B indicates an image around the vehicle 40 acquired at a time when the subsequent road-surface image is acquired.

Figure 4B:
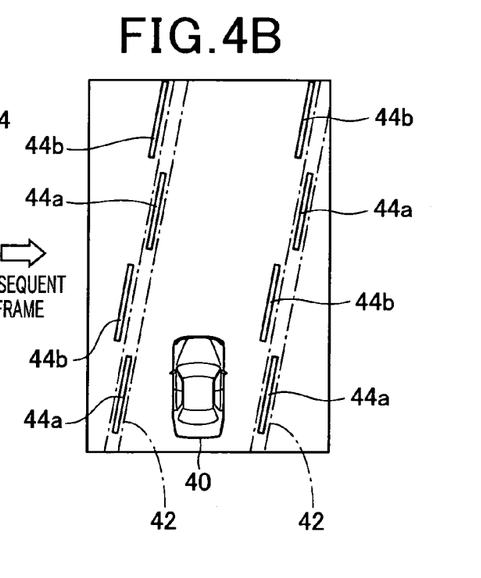

When the vehicle 40 is running towards a direction crossing the lane marking on the road, the dotted line 44 forming the lane marking 42 as shown in FIG. 4A moves in a direction opposite to the running direction of the vehicle 40 and the dotted line 44 is being at a position of the dotted line 44a as shown in FIG. 4B.

Figures 5A, 5B:
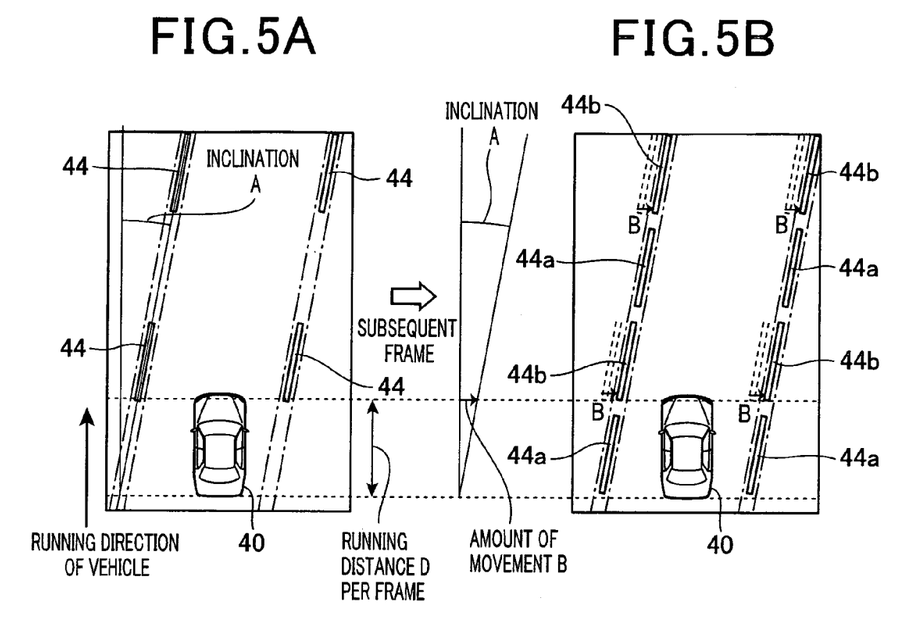
FIGS. 5A and 5B are diagrams for explaining a procedure for detecting a lane marking by using accumulated frames of road-surface images, the diagram showing a vehicle viewed from above of the vehicle.

In the FIG. 4B, when the dotted line 44b is combined with a position corresponding to the dotted line 44 of the FIG. 4A, the dotted line 44a and the dotted line 44b are not on the same lane marking 42. Then, at step 20, the location of the edge points are adjusted in order to cancel the difference of position between the dotted line 44a and the dotted line 44b by using a procedure as shown in FIGS. 5A and 5B. According to the embodiment, the dotted line 44a is shifted with an amount of movement B towards a direction perpendicular to the running direction of the vehicle 40. This movement B is defined as a moving distance of the lane marking 42 in a direction perpendicular to the direction that the vehicle 40 runs. The moving distance is defined referenced to the vehicle 40 while the vehicle runs from a time represented by FIG. 5A to a time represented by FIG. 5B. The amount of movement B can be estimated by using the distance D that the vehicle 40 runs while the above described period, and an inclination angle A formed between the direction that the vehicle 40 runs and the Lane marking 42 as following equation.

$$B = D \tan A$$

To perform above-described method, at step 20, edge points extracted from the latest frame at step 12 and edge points previously extracted from a frame at the past step 12 which is shifted with the movement B are combined.

Specifically, the distance D can be calculated based on a period from a time when the previous frame is acquired to a time when the latest frame is acquired, and a running speed of the vehicle detected by the velocity sensor 22. The angle A is an angle calculated at step 16.

When the operating mode is the dotted line mode, edge points from one past frame is combined to the edge points from the latest frame. However, when the operating mode is frame-accumulation mode, edge points from two past frames are accumulated. Subsequently, the image processing ECU 32 proceeds to step 22.

Next at step 22, an edge line is extracted by using a predetermined procedure such as the Hough transform. The image processing ECU 32 performs the Hough transform of the edge points so as to extract an edge line that most frequently passes through the edge points. When the operating mode is the normal mode, the edge points extracted at step 12 are used, and when the operating mode is dotted line mode or the frame-accumulation mode, the edge points used for the frame accumulation at steps 18 or 20 are used. It is noted that the extracted edge line at this step 22 denotes the lane marking.

At step 24, a warning procedure is executed. First, a distance between the vehicle and the lane marking is calculated based on calculated location of the lane marking. Next, based on a yaw rate detected by the yaw rate sensor 20 and the running speed of the vehicle detected by the velocity sensor 22, the image processing ECU 32 estimates the running path of the vehicle. Subsequently, based on the calculated position of the lane marking, a distance between the vehicle and the lane marking, and the estimated running path of the vehicle, the ECU 32 calculates a required period until the vehicle departs from the lane marking.

Then, it is determined that the vehicle will not depart from the lane marking when the calculated period is larger than or equal to the predetermined threshold value (1 second according to the embodiment) and proceeds to step 26 without performing the warning. Meanwhile, if the calculated period is smaller than the threshold value, it is determined that the vehicle likely departs from the lane marking and outputs a buzzer-request signal to the buzzer 14, then proceeds to step 26.

Next at step 26, it is determined whether or not the edge line is present. This procedure is performed by using the result of extracting procedure at step 22. According to the embodiment, the edge line is extracted by transforming the edge points by the Hough transform. However, it is considered that the edge line is not extracted when the number of edge points is not enough.

When it is determined that the edge line is not present at step 26 (S26: NO), that is, the edge points are not detected to recognize the edge line appropriately so that the edge line cannot be extracted at step 22, the ECU 32 sets the operating mode as the frame-accumulation mode at step 28 then returns to step 10.

When it is determined that the edge line is present (S26: YES), that is, the edge points are detected to recognize the edge line appropriately so that the edge line has been extracted at step 22, the ECU 32 proceeds to step 30.

Next, at step 30, it is determined whether or not the number of edge points on the edge line is larger than or equal to the first threshold value (three edge points according to the embodiment). In this step 30, the ECU 32 counts the number of edge points, (i.e., edge points referenced to the road-surface image acquired at step 10 in the present lane-departure warning procedure) on the edge line extracted at step 22. The edge points of the past frame, i.e., edge points frame-accumulated at step 18 and step 20 are not counted.

It is determined whether or not the edge points are on the edge line based on the distance between the edge points and the edge line. When the edge point exists within a predetermined distance from the edge line, it is determined that the edge point is on the edge line. The edge points used when the Hough transform is performed at step 22 can be determined as the edge points on the above-described edge line.

When the number of edges is not larger than or equal to the first threshold value (S30: NO), the ECU 32 sets the operating mode to the frame-accumulation mode and returns to step 10. When the number of edges is larger than or equal to the first threshold value, the ECU 32 proceeds to step 32.

It is noted that the above-described threshold value is used for a reference when the operating mode is changed from the frame-accumulation mode to either dotted line mode or normal mode. Therefore, the threshold value is preferably set to be able to detect the edge points.

Next, at step 32, it is determined whether or not the number of edge points is larger than or equal to the second threshold value. The second threshold value corresponds to the predetermined threshold value and is set as five edge points according to the embodiment. In this step 32, as similar to the procedure executed at step 30, the edge points referenced to the road-surface image acquired at step 10 in the present lane-departure warning procedure is counted.

When the number of edge points is larger than or equal to the second threshold value (S32: YES), the ECU 32 sets the operating mode to the normal mode at step 34 and returns to the step 10. When the number of edge points is not larger than or equal to the second threshold value (S32: NO), the ECU 32 sets the operating mode to the dotted line mode at step 36 and return to step 10.

(3) Advantages of the Present Invention

In the above-described lane-departure warning system 1, the lane marking is detected based on a plurality of road-surface images except when edge points extracted from the road-surface image of the single frame acquired at step 10 of the lane-departure warning procedure is on the edge line (lane marking) and the number of edge points is larger than or equal to the second threshold value (S32: YES).

Therefore, even when the lane marking is comprised of the dotted line or the Botts Dots which are arranged intermittently on the road so that the enough edge points from a single frame cannot be detected, the lane marking can be detected accurately based on enough number of edge points extracted from a plurality of frames.

Further, when the number of edge points on the lane marking is larger than or equal to the second threshold value, the lane marking can be accurately detected by only one frame so that frame-accumulation procedure is not necessary. As a result, load of processing can be reduced.

In the above-described lane-departure warning system 1, the number of frames to be combined is changed depending on the operating modes, i.e., dotted line mode or frame-accumulation mode. When the operating mode is dotted line mode, it is considered that the number of edge points necessary is maybe satisfied (i.e., the number of edge is relatively large) so that the number of frames to be accumulated is relatively low. Therefore, the processing load can be suppressed because it is not necessary to accumulate so many frames. Meanwhile, in the frame-accumulation mode where the number of edge points is relatively small, the number of frames to be accumulated becomes large. As a result, since enough number of frames is secured, the lane marking can be reliably detected.

Further, in the above-described lane-departure warning system 1, when the edge line has an inclination to the running direction of the vehicle with a predetermined angle or more, the frame-accumulation is performed referring to the inclination of the edge line. Therefore, the edge points in the accumulated frames can be appropriately placed whereby the lane marking can be detected with high accuracy.

The procedure of step 10 executed by the image processing ECU 32 corresponds to acquiring means of the present invention. The procedure of step 12 corresponds to extracting means, the procedures of steps 18 to 22 correspond to lane detecting means, the procedure of step 16 for detecting the angle between the lane marking and the running direction of the vehicle correspond to angle detecting means, the procedure of step 20 where the distance D is calculated corresponds to calculating means, the procedures at steps 32 correspond to first determining means, the procedure at step 26 corresponds to second determining means and the procedure executed at step 24 corresponds to the third determining means and the warning means.

(Modification)

The present invention is not limited to the above-described embodiment, however, various modifications can be made within the scope of the invention.

For instance, in the above-described embodiment, when the frames are accumulated at steps 18 and 20 of the lane-departure warning procedure, only the edge points extracted from the past frames are accumulated, however, the road-surface images themselves can be accumulated alternatively. Further, at step 20, the frames can be shifted by a calculated amount of movement B in the frame-accumulation processing.

In the above-described embodiment, a mathematical technique such as the Hough transform is employed in order to extract the edge lines. However, the configuration for extracting the edge lines is not limited to the Hough transform, however, other procedures or methods can be adapted to the edge extracting.

According to the embodiment, the number of frames to be accumulated is one for the dotted line mode and two for the frame-accumulation mode. However, other number of frames can be adapted to the frame-accumulation. Also, the same number of frames can be used for two operating modes (dotted mode and frame-accumulation mode).

According to the embodiment, the first threshold value at step 30 is set as three and the second threshold value at step 32 is set as five. However, other numbers can be set to the threshold values as long as the second threshold value is larger than the first threshold value.

In the above-described embodiment, at step 20, when the frames are accumulated, the edge points are moved to a direction perpendicular to the running direction of the vehicle. However, the direction to which the edge line is moved not limited to the direction perpendicular to the running direction of the vehicle as long as the direction crosses the running direction of the vehicle. For instance, the edge lines can be moved towards a direction perpendicular to the lane marking.

According to the above-described embodiment, the lane marking is detected by the edge line which is extracted based on the dotted line as shown in FIGS. 3 to 5. However, the lane marking can be detected based on objects that forms lane marking such as a painting line (solid like), a Botts Dots, a Cat's eye or a road stud other than the dotted line.

What is claimed is:

1. A detection apparatus mounted on a vehicle adapted to detect a lane-marking on a road based on a road-surface image taken from a road surface in front of the vehicle, comprising:
    an acquiring unit for periodically acquiring the road-surface image and each acquired road-surface image being framed into a single frame;
    an extracting unit for extracting an edge point from the frame framed by the acquiring unit;
    a lane detecting unit for detecting the lane-marking based on the edge point extracted by the extracting unit, and
    a first determining unit for determining whether or not the number of edge points located on the lane-marking detected by the lane detecting unit is smaller than a predetermined threshold value,
    wherein the lane detecting unit is configured to detect the lane-marking based on a plurality of edge points combined from among the edge points extracted subsequently from the road-surface images in a plurality of frames subsequently framed by the acquiring unit, when the first determining unit determines that the number of edge points is smaller than the predetermined threshold value.

2. The detection apparatus according to claim 1, further comprising
    a second determining unit for determining whether or not the lane marking is detected by using a predetermined procedure, wherein
    the lane detecting unit is configured to detect the lane-marking based on the plurality of edge points combined from among the edge points extracted subsequently from the road-surface images in a plurality of frames subsequently framed by the acquiring unit, when the second determining unit determines that the lane-marking is not detected.

3. The detection apparatus according to claim 2, wherein
    the lane detecting unit is configured to detect the lane marking based on the plurality of edge points combined from among the edge points extracted subsequently from the road-surface images in a plurality of frames subsequently framed by the acquiring unit, when the second determining unit determines that the lane-marking is not detected, the number of frames used for extracting the edge point being set to be larger than the number of frames used when the number of edge points is smaller than the predetermined threshold value.

4. The detection apparatus according to claim 1, further comprising:
an angle detecting unit for detecting an angle formed between a line extending from the lane marking detected by the lane detecting unit and a line extending from a direction that the vehicle runs; and
a calculating unit for calculating a distance that the vehicle runs during a period from a time when a previous frame is acquired to a time when a latest frame is acquired,
wherein the lane detecting unit is configured to detect the lane-marking based on the edge point extracted from the road-surface images in a plurality of frames subsequently framed by the acquiring unit such that the lane detecting unit
i) combines the plurality of frames including a latest frame and a previous frame,
ii) estimates an amount of movement of the lane-marking which moves in a direction perpendicular to a running direction of the vehicle and the movement of the lane-marking being recognized in the combined frames, the amount of the movement being estimated based on the angle detected by the angle detecting unit and the distance calculated by the calculating unit, and
iii) moves positions of the edge points extracted from the road-surface images in the combined frames based on the estimated amount of the movement so as to detect the lane-marking.

5. The detection apparatus according to claim 1, further comprising: a third determining unit for determining whether or not the vehicle runs departing from the lane-marking detected by the lane detecting unit and a warning unit for warning a vehicle inside by sounding a buzzer when the third determining unit determines that the vehicle is departing from the lane.

6. The detection apparatus according to claim 2, wherein the predetermined procedure is Hough transform.

7. A detection method performed on a vehicle for detecting a lane-marking on a road based on a road-surface image taken from a road surface in front of the vehicle, the detection method comprising steps of:
periodically acquiring the road-surface image;
framing the road-surface image into a single frame;
extracting an edge point from the frame framed by the acquiring step;
detecting the lane-marking by using a predetermined procedure based on the extracted edge point; and
determining whether or not a number of edge points located on the detected lane-marking is smaller than a predetermined threshold value,
wherein the lane-marking is detected based on a plurality of edge points combined from among the edge points extracted subsequently from the road-surface images in a plurality of frames subsequently framed by the acquiring step, when it is determined that the number of edge points is smaller than the predetermined threshold value.

8. The method according to claim 7, wherein:
only the plurality of edge points are combined from among the edge points extracted subsequently from the road surface images; and
the road-surface images in the plurality of frames are not combined.

9. The detection apparatus according to claim 1, wherein:
only the plurality of edge points are combined from among the edge points extracted subsequently from the road surface images; and
the road-surface images in the plurality of frames are not combined.

10. A detection apparatus mounted on a vehicle adapted to detect a lane-marking on a road based on one or more road-surface images taken from a road surface in front of the vehicle, comprising:
an acquiring unit for periodically acquiring each of the road-surface images and each acquired road-surface image being framed into a single frame;
an extracting unit for extracting at least one current edge point from each of the frames framed by the acquiring unit;
a lane detecting unit for detecting the lane-marking based on the current edge points extracted by the extracting unit; and
a first determining unit for determining whether or not the number of current edge points located on the lane-marking detected by the lane detecting unit is smaller than a predetermined threshold value; wherein
the lane detecting unit is configured to detect the lane-marking based on only the current edge points extracted from the road-surface images combined with only one or more new edge points extracted by the extracting unit from a plurality of frames subsequently framed by the acquiring unit, when the first determining unit determines that the number of current edge points is smaller than the predetermined threshold value; and
the road surface images in the plurality of frames are not combined.

11. The detection apparatus according to claim 10, further comprising
a second determining unit for determining whether or not the lane marking is detected by using a predetermined procedure, wherein
the lane detecting unit is configured to detect the lane-marking based on the current edge points extracted from the road-surface images combined with only one or more new edge points extracted by the extracting unit from a plurality of frames subsequently framed by the acquiring unit, when the second determining unit determines that the lane-marking is not detected.

12. The detection apparatus according to claim 11, wherein the lane detecting unit is configured to detect the lane marking based on the current edge point extracted from the road-surface images combined with only one or more new edge points extracted by the extracting unit from a plurality of frames subsequently framed by the acquiring unit, when the second determining unit determines that the lane-marking is not detected, the number of frames used for extracting the edge point being set to be larger than the number of frames used when the number of current edge points is smaller than the predetermined threshold value.

13. The detection apparatus according to claim 11, wherein the predetermined procedure is Hough transform.

14. The detection apparatus according to claim 10, further comprising:
an angle detecting unit for detecting an angle formed between a line extending from the lane marking detected by the lane detecting unit and a line extending from a direction that the vehicle runs; and
a calculating unit for calculating a distance that the vehicle runs during a period from a time when a previous frame is acquired to a time when a latest frame is acquired,
wherein the lane detecting unit is configured to detect the lane-marking based on the edge point extracted from the road-surface images in a plurality of frames subsequently framed by the acquiring unit such that the lane detecting unit i) combines the plurality of frames including a latest frame and a previous frame, ii) estimates an amount of movement of the lane-marking which moves in a direction perpendicular to a running direction of the vehicle and the movement of the lane-marking being recognized in the combined frames, the amount of the movement being estimated based on the angle detected by the angle detecting unit and the distance calculated by the calculating unit, and iii) moves positions of the edge points extracted from the road-surface images in the combined frames based on the estimated amount of the movement so as to detect the lane-marking.

15. The detection apparatus according to claim 10, further comprising:

a third determining unit for determining whether or not the vehicle runs departing from the lane-marking detected by the lane detecting unit and a warning unit for warning a vehicle inside by sounding a buzzer when the third determining unit determines that the vehicle is departing from the lane.

* * * * *